United States Patent [19]

Ichimura et al.

[11] Patent Number: 4,521,378
[45] Date of Patent: Jun. 4, 1985

[54] FLUID BED REACTOR SYSTEM COMPOSED OF CYLINDRICAL REACTION VESSEL EQUIPPED WITH DISTRIBUTION PLATE AND AGITATOR

[75] Inventors: Mitsunori Ichimura; Ryoichi Yamamoto, both of Ichihara; Katsutoshi Horimoto, Ohtake, all of Japan

[73] Assignee: Mitsui Petrochemical Industries, Ltd., Tokyo, Japan

[21] Appl. No.: 473,433

[22] Filed: Mar. 9, 1983

[30] Foreign Application Priority Data

Mar. 9, 1982 [JP] Japan ............................ 57-37830

[51] Int. Cl.³ .............................. B01J 8/38; B01J 8/44
[52] U.S. Cl. ................................ 422/135; 34/57 A; 422/143; 422/311; 431/7; 431/170; 432/15; 432/58
[58] Field of Search ............. 422/135, 143, 311; 431/7, 170; 432/15, 58; 34/57 A; 201/31

[56] References Cited

U.S. PATENT DOCUMENTS

| 2,389,133 | 11/1945 | Brassert et al. | 34/57 A |
|---|---|---|---|
| 3,099,538 | 7/1963 | Kronig et al. | 34/57 A |
| 3,821,342 | 6/1974 | Hurd | 34/57 C X |
| 4,366,123 | 12/1982 | Kato et al. | 422/225 |
| 4,397,102 | 8/1983 | Gamble et al. | 34/57 A |

FOREIGN PATENT DOCUMENTS

| 100977 | 8/1979 | Japan | 422/143 |
|---|---|---|---|
| 68506 | 5/1980 | Japan | 422/143 |
| 0827146 | 5/1981 | U.S.S.R. | 422/143 |

*Primary Examiner*—Barry S. Richman
*Assistant Examiner*—William R. Johnson
*Attorney, Agent, or Firm*—Wenderoth, Lind & Ponack

[57] ABSTRACT

A fluid bed reactor system for olefin polymerization composed of a cylindrical reaction vessel equipped with a distribution plate and an agitator, characterized in that the distribution plate satisfies the following conditions, (i) each of many passage holes provided in the distribution plate for passage of the fluidizing gas medium is covered with a cap having an opening, (ii) the opening in said cap is provided only on one side of the cap, and the direction (A) of the opening is not opposite to the direction (B) of the rotational flow, (iii) the direction (A) of the opening varies with the distance (d) from the center (X) of the plate to the center (Y) of the hole, (iv) the opening direction (A) of a cap or caps at a hole or holes whose distance (d) is minimum is directed nearer to the center (X) than is the tangential direction of a circle having the center (X) as a center and the distance ($d_{min.}$) to the hole or holes as a radius, (v) the opening direction (A) of a cap or caps at a hole or holes whose distance (d) is maximum is directed farther from the center (X) than is the tangential direction of a circle having the center (X) as a center and the distance ($d_{max.}$) to the hole or holes as a radius, and (vi) the opening directions (A) of caps at holes other than the hole or holes specified in (iv) and (v) are displaced from the direction specified in (iv) to the direction specified in (v) according to the distance (d) to these holes.

3 Claims, 16 Drawing Figures

FLUID BED REACTOR SYSTEM COMPOSED OF CYLINDRICAL REACTION VESSEL EQUIPPED WITH DISTRIBUTION PLATE AND AGITATOR

This invention relates to an improved fluid bed reactor system composed of a cylindrical reaction vessel including a distribution plate and an agitator. Specifically, this invention relates to an improved fluid bed reactor system in which various troubles such as the blocking of the distribution plate, the formation of polymer agglomerates by the falling of polymer particles through fluidizing gas medium passing holes of the distribution plate, and the stagnation, adhesion and agglomeration of polymer at caps for covering the passage holes and in their neighborhood, and thus, an olefin monomer or monomers can be polymerized or copolymerized advantageously under fluidized conditions smoothly and stably.

More specifically, this invention pertains to a fluid bed reactor system in which an olefin monomer or monomers can be catalytically polymerized in a fluid bed under fluidized conditions and comprising a cylindrical reaction vessel, a distribution plate provided in the lower section of the vessel, an agitator disposed in a fluidized bed above the plate and adapted to cause a rotational flow in the fluidized bed, a fluidizing gas medium supply line means provided below the plate and adapted to cause said fluidized conditions, a catalyst introducing line means adapted to supply a catalyst to the fluidized bed, a fluidizing gas medium recycle line means provided above the fluidized bed in the reaction vessel and adapted to recycle the gas medium to the gas medium supply line means, and a polymer product recovering line means adapted to recover the polymer product from the fluidized bed; characterized in that the distribution plate satisfies the following conditions, (i) each of many passage holes provided in the distribution plate for passage of the fluidizing gas medium is covered with a cap having an opening, (ii) the opening in said cap is provided only on one side of the cap, and the direction (A) of the opening is not opposite to the direction (B) of the rotational flow, (iii) the direction (A) of the opening varies with the distance (d) from the center (X) of the plate to the center (Y) of said hole, (iv) the opening direction (A) of a cap or caps at a hole or holes whose distance (d) is minimum is directed nearer to the center (X) than is the tangential direction of a circle having the center (X) as a center and the distance ($d_{min}$) to the hole or holes as a radius, (v) the opening direction (A) of a cap or caps at a hole or holes whose distance (d) is maximum is directed farther from the center (X) than is the tangential direction of a circle having the center (X) as a center and the distance $d_{max}$) to the hole or holes as a radius, and (vi) the opening directions (A) of caps at holes other than the hole or holes specified in (iv) and (v) are displaced from the direction specified in (iv) to the direction specified in (v) according to the distance (d) to these holes.

The term "polymerization" and "polymer", as used in the present specification, are used to mean both "homopolymerization" and "copolymerization", and both "homopolymer" and "copolymer", respectively.

As a result of improvements achieved on the transition metal catalyst component for olefin polymerization, the productivity of olefin polymers per unit weight of the transition metal has greatly increased in the polymerization of olefins with a catalyst composed of such a highly active transition metal catalyst component, an organometallic compound of a metal of Groups I to III of the periodic table such as an organoaluminum compound, and optionally a third component such as an electron donor. This has made it possible to omit an operation of removing the catalyst from the polymerization product after the polymerization. When such a highly active catalyst is used, a vapor-phase olefin polymerization method attracts special attention because it permits a very simple post-operation after the polymerization.

Many proposals have been made as to such a fluid bed reactor system in which an olefin monomer or monomers can be catalytically polymerized in a fluid bed under fluidized conditions. One known fluid bed reactor system is that shown schematically in FIG. 1 of the accompanying drawings which is composed of a cylindrical reaction vessel equipped with a distribution plate and an agitator adapted to cause a rotational flow in the fluidized bed.

Figure 1:
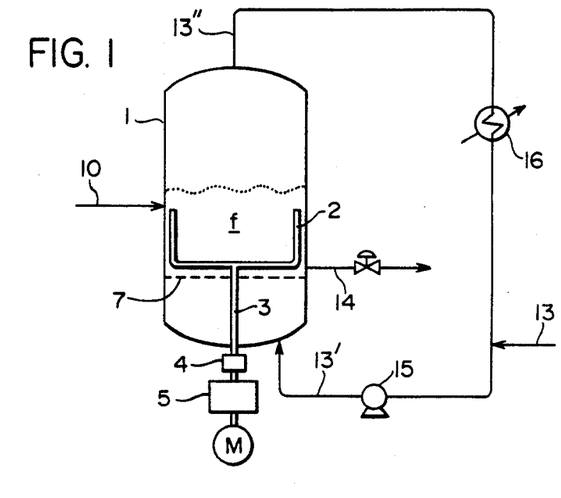

In the embodient shown in FIG. 1, the fluid bed reactor system is comprised of a cylindrical reaction vessel 1, a distribution plate 7 provided in the lower section of the vessel, an agitator 2 provided in a fluidized bed f formed above the plate and adapted to cause a rotational flow in the fluidized bed, a fluidizing gas medium supply line means 13' provided below the plate and adapted to provide a fluidized condition, a catalyst introducing line means 10 adapted to supply a catalyst to the fluidized bed, a fluidizing gas medium recycle line means 13" provided above the fluidized bed f in the reaction vessel and adapted to recycle the gas medium to the gas medium supply line means 13', and a polymer product recovering line means 14 adapted to recover the polymer product from the fluidized bed f. Furthermore, in FIG. 1, the reference numeral 3 represens a rotating shaft of the agitator; 4, a mechanical seal member provided in the shaft; 5, a decelerator; M, a drive motor; 15, a blower, 16, a heat exchanger; and 13, an olefin supply line means.

In the embodiment shown in FIG. 1, the olefin supply line means 13 passes through the gas medium supply line means 13', and is introduced into the cylindrical reaction vessel 1 at a suitable position below the distribution plate 7 of the vessel 1. The olefin gas introduced through the olefin supply line means 13 can by itself serve as the fluidizing gas medium. Alternatively, it may be introduced into the vessel 1 together with another suitable fluidizing gas medium such as a saturated hydrocarbon (e.g., propane), ethylene, an inert gas such as nitrogen, and also with a molecular weight controlling agent such as hydrogen gas. If desired, the olefin gas and/or the molecular weight controlling agent may be introduced into the vessel 1 separately from the fluidizing gas medium. Usually, they are introduced together in the form of an olefin-containing gas. Thus, a fluidized bed f is formed. In the meantime, a catalyst is introduced into the vessel 1 through the catalyst introducing line means 10. In this manner, the olefin is polymerized in the vapor phase in the presence of the catalyst under conditions such that a rotational flow rotating in one direction is generated by the agitator 2 in the fluidized bed. The unreacted olefin gas, or both the unreacted olefin gas and another suitable fluidizing gas medium and/or a molecular weight controlling agent, etc., which rise from the resulting fluidized bed f, are passed through the fluidizing gas medium recycle line means 13", and cooled at the heat exchanger 16, after which the cooled materials are recycled to the vessel 1 through the gas medium supply line means 13' from a suitable position below the distribution plate 7 of the cylindrical reaction vessel 1. The olefin polymer formed in the fluidized bed f is withdrawn from the polymer product receiving line means 14 disposed at a suitable position and adapted to recover the polymer from the fluidized bed f of the cylindrical reaction vessel.

The fluid bed reactor system in which an olefin monomer or monomers can be catalytically polymerized in a fluid bed under fluidized conditions has the advantage that the amount or flow rate of gas components such as a fluidizing gas medium, an olefin gas and a molecular weight controlling agent introduced from below the distribution plate is relatively small. On the other hand, the small gas flow rate causes various troubles. For example, the olefin polymer formed in the fluidized bed f adheres to the distribution plate to block up many passages formed thereon for the passage of the fluidizing gas medium. The dynamic pressure generated by the rotation of the agitator causes the resulting olefin polymer particles to fall through the passage holes of the distribution plate to form polymer agglomerates. Or the fine polymer powder accompanying gas components withdrawn from the fluidizing gas medium recycle line means provided above the fluidized bed is recycled together with the recycle gas components and blocks up the distribution plate from below. Because of these troubles, it is difficult to polymerize an olefin monomer or monomers smoothly and stably, and a continuous operation for a long period of time becomes impossible.

If in an attempt to avoid this disadvantage, the size of the passage holes of the distribution plate for the passage of the fluidizing gas medium is increased, the advantage of the small gas flow rate is lost. Moreover, the formation of polymer agglomerates as a result of the falling of the polymer powder below the plate, and the adhesion of the polymer powder to the inside wall of the reaction vessel become more pronounced.

In order to remove the aforesaid troubles in the fluid bed reactor system, it may be possible to cover the gas medium passing holes of the distribution plate with caps which permit passage of the gas medium. For example, U.S. Pat. No. 4,003,712 describes the usability of a screen, a slotted plate, a perforated plate and a plate of the bubble cap type as the distribution plate although it relates to a fluid bed reactor system for vapor-phase polymerization which does not include an agitator adapted to cause a rotational flow in the fluidized bed. However, it gives no specific disclosure about the structure of the plate of the bubble cap type. Investigations of the present inventors have shown that if an ordinary bubble cap type plate having caps provided such that they cover holes for passage of a fluidizing gas medium and a suitable clearance permitting the passage of the gas medium is provided between the peripheral edge portion of each cap and the surface of the plate is utilized as a distribution plate in the fluid bed reactor system, the stagnation, adhesion and agglomeration of the polymer at the caps covering the holes and in the vicinity thereof are accelerated to produce worse results. It has also been found that in a fluid bed reactor system composed of a cylindrical reaction vessel equipped with a distribution plate and an agitator, the olefin polymer powder falls through the gas medium passage holes by the dynamic pressure indiced by the rotation of the agitator and forms agglomerates, but this trouble cannot be eliminated, and that the stagnation, adhesion and agglomeration of the polymer at the caps and their neighborhood are accelerated.

The present inventors have made investigations in order to provide an improved fluid bed reactor system which can overcome the troubles of the aforesaid fluid bed reactor system composed of a cylindrical reaction vessel equipped with a distribution plate and an agitator adapted to cause a rotational flow in a fluidized bed.

These investigations have led to the discovery that a fluid bed reactor system composed of a cylindrical reaction vessel equipped with a distribution plate and an agitator adapted to cause a rotational flow in a fluidized bed which can advantageously avoid the aforesaid troubles can be provided by using such a distribution plate that many holes therein for passage of a fluidizing gas medium are covered with caps having a specified cap structure and a specified cap arrangement.

It has specifically been found that by satisfying the cap structure conditions (i) and (ii) and the cap arrangement conditions (iii) to (vi) described hereinabove, there can be provided an improved fluid bed reactor system in which the various troubles such as the blocking of the distribution plate, the formation of polymer agglomerates by the falling of the polymer particles through the fluidizing gas medium holes of the distribution plate, and the stagnation, adhesion and agglomeration of the polymer in the caps covering the passage holes and their vicinity can be avoided, and an olefin monomer or monomers can be advantageously polymerized or copolymerized under fluidized conditions smoothly and stably.

It is an object of this invention therefore to provide an improved fluid bed reactor system composed of a cylindrical reaction vessel equipped with a distribution plate and an agitator.

The above and other objects and advantages of this invention will become more apparent from the following description.

The fluid bed reactor system of the invention in which an olefin monomer or comonomers can be catalytically polymerized in a fluid bed under fluidized conditions is comprised of a cylindrical reaction vessel, a distribution plate provided in the lower section of the vessel, an agitator disposed in a fluidized bed formed above the plate and adapted to cause a rotational flow in the fluidized bed, a fluidizing gas medium supply line means provided below the plate and adapted to cause said fluidized conditions, a catalyst introducing line means adapted to supply a catalyst to the fludized bed, a fluidizing gas medium recycle line means provided above the fludized bed in the reaction vessel and adapted to recycle the gas medium to the gas medium supply line means, and a polymer product recovering line means adapted to recover the polymer product from the fluidized bed.

The fluid bed reactor system of the invention is characterized in that the distribution plate satisfies the following conditions with regard to the structure and arrangement of the caps.

(i) Each of many passage holes provided in the plate for passage of the fluidizing gas medium is covered with a cap having an opening, (ii) the opening in said cap is provided only on one side of the cap, and the direction (A) of the opening is not opposite to the direction (B) of the rotational flow, (iii) the direction (A) of the opening varies with the distance (d) from the center (X) of the plate to the center (Y) of said hole, (iv) the opening direction (A) of a cap or caps at a hole or holes whose distance (d) is minimum is directed nearer to the center (X) than is the tangential direction of a circle having the center (X) as a center and the distance ($d_{min.}$) to the hole or holes as a radius, (v) the opening direction (A) of a cap or caps at a hole or holes whose distance (d) is maximum is directed farther from the center (X) than is the tangential direction of a circle having the center (X) as a center and the distance ($d_{max.}$) to the hole or holes as a radius, and (vi) the opening directions (A) of caps at holes other than the hole or holes specified in (iv) and (v) are displaced from the direction specified in (iv) to the direction specified in (v) according to the distance (d) to these holes.

FIGS. 3-a to 3-c are top plan views of several examples of the arrangement of passage holes provided in the distribution plate for passage of a fluidizing gas medium. In FIG. 4, a half of the distribution plate is broken away. FIGS. 5-a to 5-f are perspective views showing several examples of the shape of the caps. FIGS. 6-a and 6-b are a front elevation viewed in the cap opening direction and a sectional view taken in a direction at right angles thereto, which show one example of the positional relation between one passage hole and a cap therefor. FIGS. 7-a and 7-b are top plan views of a cap.

Figure 3A:
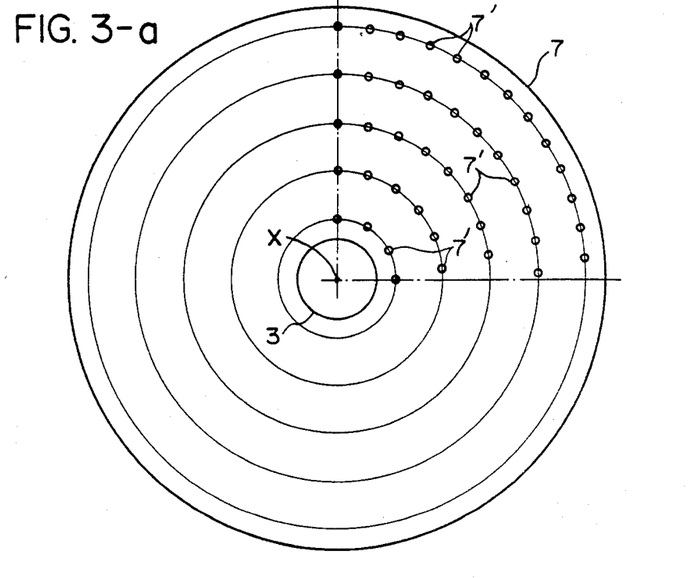
Figure 3B:
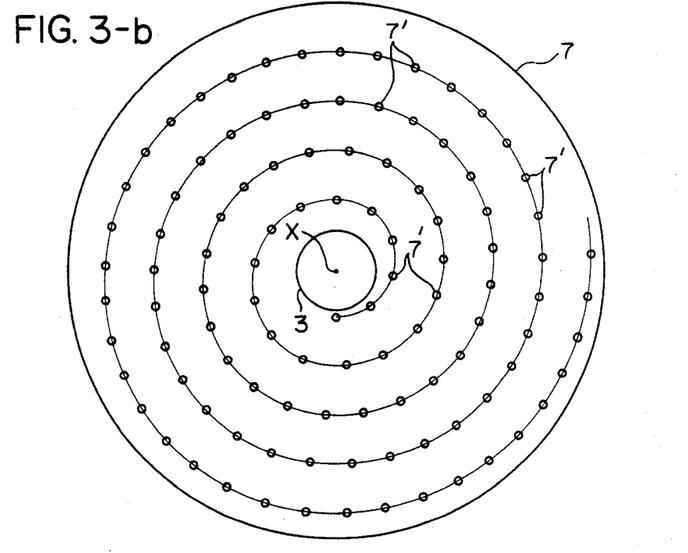
Figures 3C, 5A, 5D:
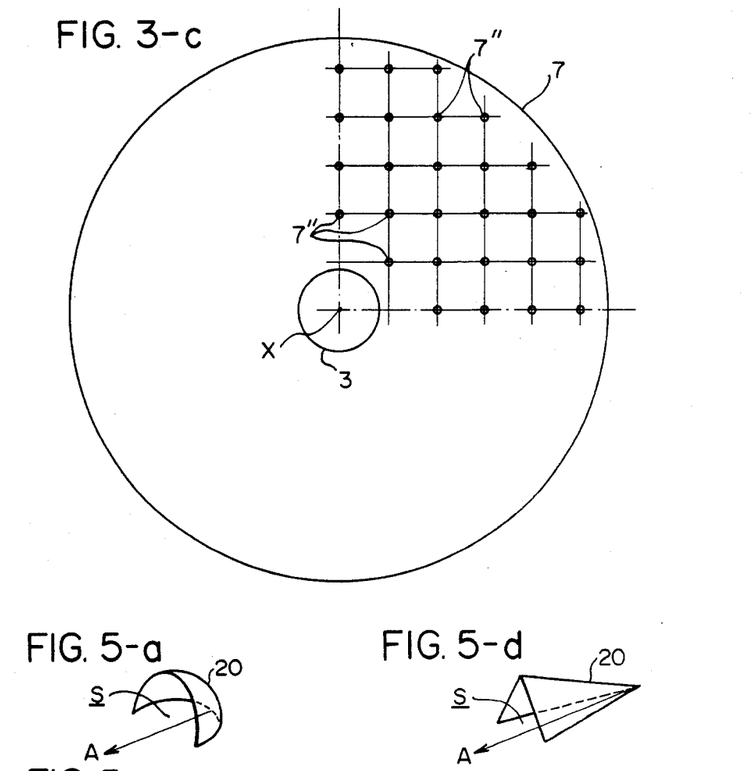

As shown in FIGS. 3-a to 3-c, the distribution plate has formed therein many passage holes 7′ for the passage of a fluidizing gas medium. In the embodiment shown in FIG. 3-a, these passage holes are provided on five concentrical circles having the center X (agreeing with the central axis of the rotating shaft 3 of the agitator) of the plate. In FIG. 3-a, passage holes in the remaining ¾ of the plate are omitted. FIG. 3-b shows an example in which the passage holes are provided such that they progressively move away from the center (X) of the plate spirally outwardly. In FIG. 3-c, the passage holes are provided at crossing points of many parallel lines which are parallel to a diameter passing through the center X of the plate and a diameter crossing it at right angles thereto. In this example, too, the showing of passage holes in the remaining ¾ of the plate is omitted. FIGS. 3-a to 3-c only show some examples of the hole arrangement, and there is no particular restriction on the arrangement of the passage holes used in the invention.

Figure 4:
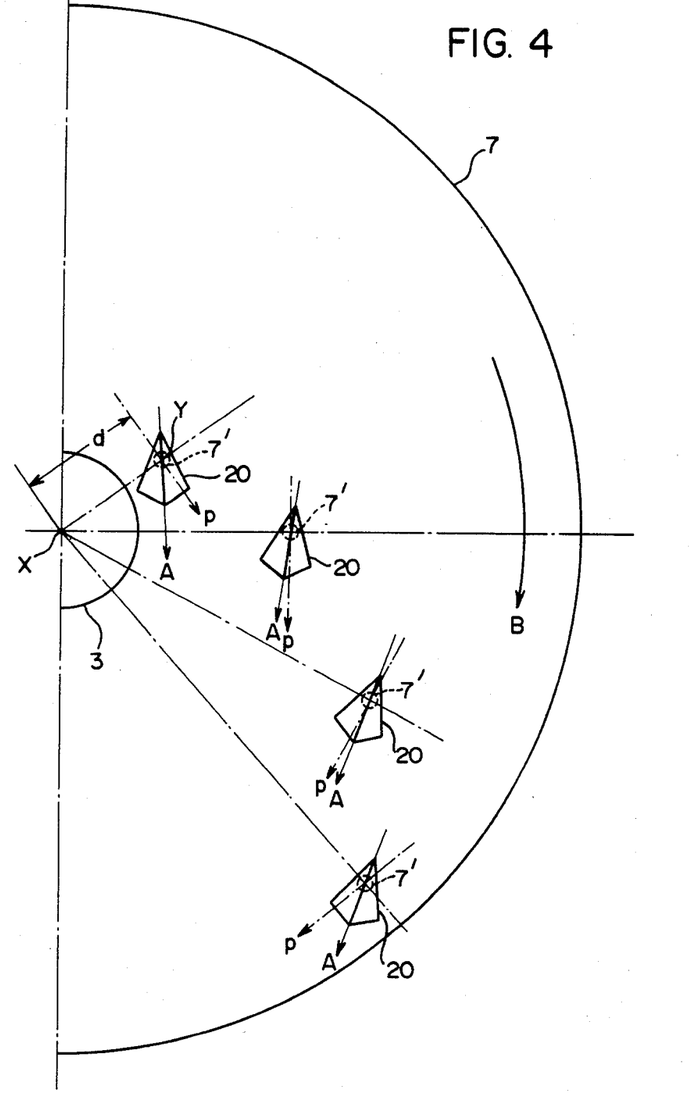
FIG. 4 is a planar explanatory view showing only four passage holes in order to illustrate the structure and arrangement of caps which cover the passage holes.
Figure 5B:
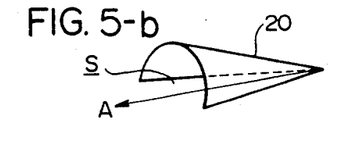
Figure 5C:
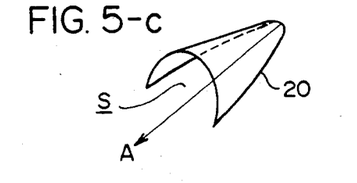
Figure 5E:
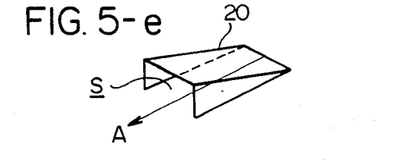
Figure 5F:
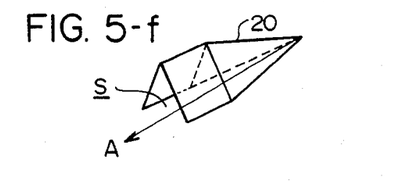

In the system of this invention, these many passage holes 7′ provided on the distribution plate 7 are individually covered with caps on the plate each having an opening. In FIG. 4, each passage hole 7′ is covered with a cap 20. The cap 20 has an opening only on one side thereof in the opening direction (A) shown by arrow A in the drawing. The opening direction (A) is not opposite to the direction (B) of a rotational flow generated in the fluidized bed by the agitator (see FIG. 2).

The opening direction (A) of the opening provided only on one side of the cap means the direction of the central line in the top plan view of the cap as shown in FIGS. 4, 5-a to 5-f and 7-a to 7-b.

As stated above, the distribution plate in the system of this invention satisfies the following structural conditions.

(i) Each of many passage holes provided in the plate for passage of the fluidizing gas medium is covered with a cap having an opening, and (ii) the opening in said cap is provided only on one side of the cap, and the direction (A) of its opening is not opposite to the direction (B) of the rotational flow.

Furthermore, in the present invention, (iii) the opening direction (A) varies according to the distance (d) from the center (X) of the distribution plate to the center (Y) of the fluidizing gas medium passage hole 7′. In FIG. 4, the four passage holes differ from each other in the distance (d) from the center (X) to the center (Y), and the opening direction (A) varies according to the distance (d).

Furthermore, in the system of this invention, (iv) the opening direction (A) of a cap or caps at a hole or holes whose distance (d) is minimum is nearer to the center (X) than is the tangential direction of a circle having the center (X) as a center and the distance ($d_{min.}$) to the hole or holes as a radius. In FIG. 4, the opening direction (A) of a cap for a hole which exists innermost, namely has a minimum distance (d), is nearer to the center (X) than is the tangential direction (p) of a circle having the center (X) as a center and the distance ($d_{min.}$) to the hole or holes as a radius.

Moreover, in the system of this invention, (v) the opening direction (A) of a cap or caps at a hole or holes whose distance (d) is maximum is farther from the center (X) than is the tangential direction of a circle having the center (X) as a center and the distance ($d_{max.}$) to the hole or holes as a radius. In FIG. 4, the opening direction (A) of a cap for a hole located outermost, namely having a maximum distance (d) is farther from the center (X) than is the tangential direction (p) of a circle having the center (X) as a center and the distance to the hole ($d_{max.}$) as a radius.

In addition to the conditions (iii), (iv) and (v), the distribution plate in accordance with this invention should also satisfy the following cap arrangement condition (vi) that the opening directions (A) of caps at holes other than the hole or holes specified in (iv) and (v) are directed in a direction specified in (v) according to the distance (d) to these holes. In FIG. 4, the opening directions (A) of caps located between the cap or caps covering the hole or holes at a minimum distance form the center X and the cap or caps covering hole or holes having a maximum distance are displaced from the opening direction of the cap or caps having the minimum distance to the opening direction of the cap or caps having the maximum distance.

When the distribution plate meets the above conditions (i) to (iv), the fluid bed reaction system of the invention can advantageously overcome the many troubles described hereinabove, and an olefin monomer or monomers can be polymerized advantageously under fluidized conditions smoothly and stably.

In the present invention, the cap 20 having an opening only on its one side and covering a passage hole for a fluidizing gas medium may be in various shapes. Preferably, the cap 20 is inclined in a direction opposite to its opening direction (A) and from its opening end portion toward the surface of the distribution plate. Several preferred examples of the cap shape are shown in FIGS.

5-a to 5-f. FIG. 5-a shows a hemispherical shell which is partly cut away to form an opening. FIG. 5-b shows a conical shell which is cut half along its central line whereby the bottom of the cone forms an opening. FIG. 5-c shows a cylindrical shell which is cut across its central line in a direction reaching its bottom that forms an opening. FIG. 5-d shows a triangular pyramidal shell whose bottom forms an opening. FIG. 5-e shows a cubic shell which has been cut away obliquely together with one of its edges whereby the part of a rectangle having a smaller area forms an opening. FIG. 5-f shows a similar shape to FIG. 5-d which further has an extension like the shape of a triangular prismatic shell at the opening portion of the shell shown in FIG. 5-d. In FIGS. 5-a to 5-f, s represents the surface of the distribution plate. In covering caps having such a shape that they have an edge at their upper surface, for example the shapes shown in FIGS. 5-d, 5-e and 5-f, the edge portion may be formed in a suitable curved surface shape including the edge. These are only several examples of the cap shape, and various designs of the cap shape are possible. A cap having the shape of a triangular pyramid or a like shape which is inclined in a direction opposite to the opening direction (A) from the opening end portion to the surface of the distribution plate is especially preferred in this invention.

Figure 6A:
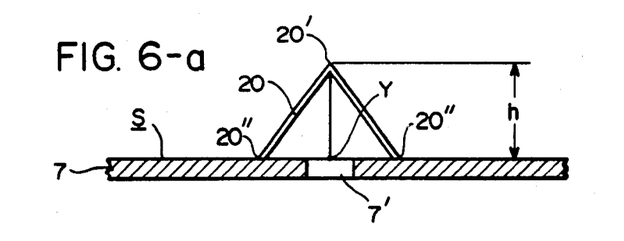
Figure 6B:
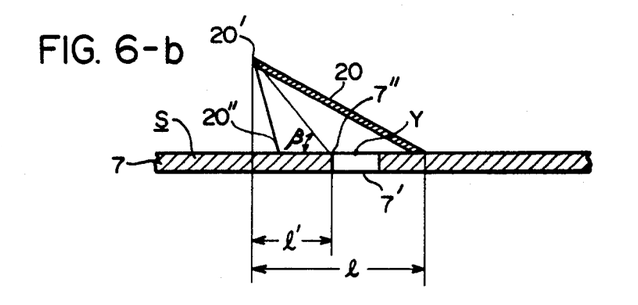
Figure 7A:
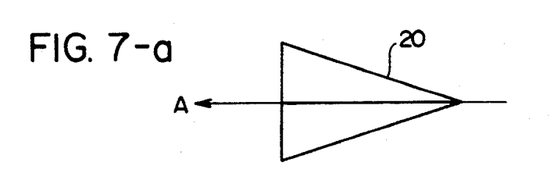
Figure 7B:
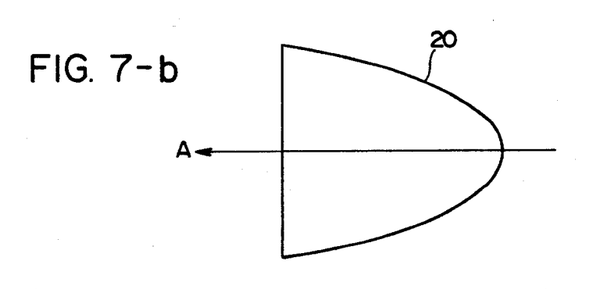

In the present invention, the fludizing gas medium passage hole 7' is covered with the covering cap 20 having the opening described above. Preferably, the positional relation between the passage hole 7' and the opening end portion of the covering cap 20 is selected such that the polymer obtained by using the fluid bed reaction system of this invention does not reach the passage hole 7'. FIGS. 6-a and 6-b show one example of the above positional relation. In this example, a covering cap 20 having a triangular pyramidal shape similar to the shape shown in FIG. 5-d is used. FIG. 6-a is a sectional view seen from the opening direction (A) of the opening formed only on one side of the cap 20. In this example, the upper end 20' of the opening portion of the cap is located more forwardly in the opening direction (A) than the lower ends 20" of the opening portion (those parts of the opening end portion of the cap which contact the distribution plate surface S). The positional relation between the passage hole 7' and the end portion of the opening of the covering cap 20 is shown by $<\beta$ in the drawing. Preferably, the angle formed between the line connecting the upper end 20' of the cap opening and the position 7" nearest to the opening end portion of the passage hole 7' is smaller than the drained angle of repose of the polymer formed as a result of polymerization.

The "drained angle of repose" is a value determined as follows: A transparent cylinder having a height of 100 mm and an inside diameter of 130 mm is used as a measuring vessel, and a draining gate having a diameter of 30 mm is provided centrally at the bottom portion of the cylinder. Three legs having a length of 80 mm are provided at the bottom portion of this vessel. The polymer to be measured is put gently into the vessel to a height of 80 mm. The sliding plate of the draining gate is pulled away to allow the polymer to fall spontaneously. The angle of inclination of the polymer remaining in the vessel is measured, and made the drained angle of repose.

Preferably, $<\beta$ is usually selected from the range of about 20° to about 55° although it can be suitably changed depending upon the type and particle size distribution of the resulting polymer, the shape of the cap, etc.

The following example illustrates the polymerization of olefin in the fluid bed reaction system of this invention.

EXAMPLE 1

Figure 2:
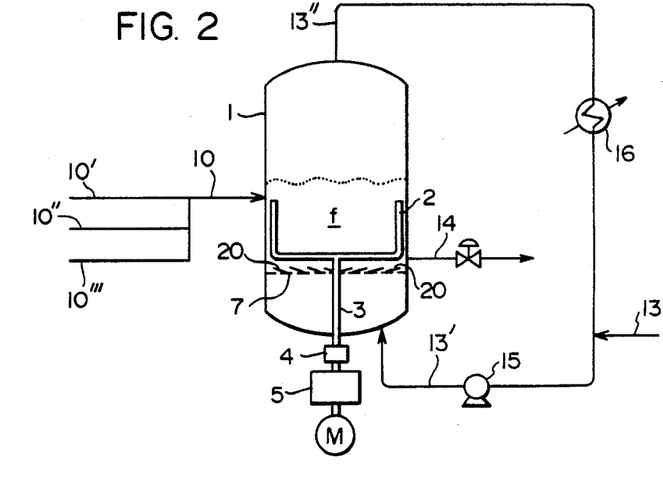
FIG. 2 of the accompanying drawings show a schematic sectional view of the fluid bed reactor system of this invention which is similar to that shown in FIG. 1 except that the system of this invention has a distribution plate different from the distribution plate shown in FIG. 1.

A fluid bed reactor system of the type shown in FIG. 2 of the accompanying drawings was used. This reactor system was comprised of a cylindrical reaction vessel 1, a distribution plate 7 provided in the lower section of the vessel, an agitator 2 disposed in a fluidized bed formed above the plate and adapted to cause a rotational flow in the fluidized bed, a fluidizing gas medium supply line means 13' adapted to cause fluidized conditions, a catalyst introducing line means 10 adapted to supply a catalyst to the fluidized bed, a fluidizing gas medium recycle line means 13" adapted to recycle the gas medium to the gas medium supply line means 13', and a polymer product recovering line means 14 adapted to recover the polymer product from the fluidized bed. The anchor-type agitator 2 was supported by a shaft 3, and rotated by a motor M after deceleration by a decelerator 5. To prevent gas leakage, a shaft seal 4 was fitted to the shaft 3. The gas distributing plate 7 was provided at a position 900 mm above the bottom of the reactor. The clearance between the distribution plate and the lower end of the agitator was maintained at 50 mm. The cylindrical reaction vessel 1 was a stainless steel vessel having a total height of 4900 mm and an inside diameter of 1000 mm. The agitator 2 had a triangular sectional shape.

The specifications of the distribution plate were as follows:

1. Arrangement, number and size of passage holes for the fluidizing gas medium

Innermost holes (holes nearest to the shaft 3) were provided on a circumference where the distance ($d_{min}$) from the center (X) of the distribution plate to the center (Y) of the hole was 105 mm, and outermost holes were provided on a circumference where the distance ($d_{max}$) from the center (X) of the plate to the center (Y) of the hole was 430 mm. The space between these was divided at substantially equal intervals to provide 8 concentric circles in total. A plurality of nearly equally spaced holes were provided on each of these concentric circles in the arrangement shown in FIG. 3-a. The total number of the holes was 224, and each of the holes had a diameter of 10 mm.

2. Shape and size of the cape 20

The holes were respectively covered with caps having the shape shown in FIGS. 6-a and 6-b. The angle $<\beta$ shown in FIG. 6-b was adjusted to 45°. The cap length shown in FIG. 6-b was adjusted to 48 mm. The two interior angles 20' and 20" of the opening portion shown in FIG. 6-a were each adjusted to 56°. The distance l' shown in FIG. 6-b was 26 mm, and the height shown in FIG. 6-a was 26 mm.

3. Opening direction of the opening of the cap 20

The opening direction was set in the same way as shown in FIG. 4. The angle formed between the opening direction (A) of the covering caps for the holes at a distance ($d_{min}$) and the tangential direction (p) shown in FIG. 4 was 20°, and the angle formed between the opening direction (A) of the covering caps for the holes at distance ($d_{max}$) and the tangential direction (p) was 45°. The covering caps for the holes located between them were provided so that they were displaced from the former direction to the latter direction.

Preparation of Ti-catalyst Component

Anhydrous magnesium chloride (4.76 g; 50 mmoles), 25 ml of decane and 23.4 ml (150 mmoles) of 2-ethylhexyl alcohol were reacted at 130° C. for 2 hours to form a uniform solution. Phthalic anhydride (1.11 g; 7.5 mmoles) was added to the solution, and the mixture was stirred at 130° C. for 1 hour to dissolve phthalic anhydride in the uniform solution. The resulting uniform solution was cooled to room temperature, and added dropwise over the course of 1 hour to 200 ml (1.8 moles) of titanium tetrachloride maintained at −20° C. After the addition, the temperature of the mixed solution was raised to 110° C. over the course of 4 hours. When the temperature reached 110° C., 2.68 ml (12.5 mmoles) of diisobutyl phthalate was added, and the mixture was maintained at the same temperature for 2 hours with stirring. After the reaction for 2 hours, the reaction mixture was hot-filtered to collect a solid portion. The solid portion was re-suspended in 200 ml of TiCl$_4$, and again reacted at 110° C. for 2 hours. After the reaction, the solid portion was collected by hot filtration, and washed fully with decane and hexane at 110° C. until no free titanium compound was detected in the washings. The solid titanium catalyst component (A) synthesized by the above method was stored as a hexane slurry, but a part of it was dried in order to examine the catalyst composition. The solid titanium catalyst component (A) so obtained contained 3.1% by weight of titanium, 56.0% by weight of chlorine, 17.0% by weight of magnesium and 20.9% by weight of diisobutyl phthalate.

Pretreatment of the Catalyst

The resulting catalyst slurry was again suspended in hexane so that its concentration became 10 mmoles/liter as Ti atom. Triethyl aluminum was added so that its concentration reached 30 mmoles/liter. Furthermore, propylene was fed in a proportion of 3 g per gram of the titanium catalyst component and the catalyst was treated at 20° C.

Polymerization of Propylene

Propylene was polymerized using the fluid bed reactor system shown in FIG. 2.

Polypropylene powder having an average particle diameter of 600 microns was fed to a height of 1500 mm on the upper part of the gas distributing plate. Propylene gas was fed from the line 13, sent to the vessel 1 through the line 13' by means of a recycle gas blower 15, and recycled through the line 13".

The titanium catalyst was re-slurried so that its concentration became 5 mmoles/liter of hexane, and fed at a rate of 1.2 liters/hr from the line 10 through the line 10'. Triethyl aluminum is fed at a rate of 300 mmoles/hr from line 10 through line 10". Diphenyldimethoxysilane as a third catalyst component was fed at a rate of 45 mmoles/hr from the line 10 through a line 10'''.

Propylene gas was fed at a rate of 120 kg/hr from the line 13, and hydrogen gas was fed from the line 13 at a mole ratio of 0.015 to propylene. The reaction temperature was maintained at 80° C. by the heat exchanger 16, and the reaction pressure was maintained at 20 kg/cm$^2$·G. The rotating speed of the agitator 2 was adjusted to 40 rpm. The superficial velocity in a column of the gases was adjusted to 20 cm/sec.

The resulting polymer was withdrawn from the line 14 so that the amount of the polymer in the reactor was maintained constant.

The propylene polymer obtained had an isotacticity index of 97% by weight, a melt flow rate of 11 g/10 min., and intrinsic viscosity of 1.76 dl/g, a bulk density of 450 kg/m$^3$ and an average particle diameter of 600 microns.

Under the above conditions, the reactor system was operated continuously for 25 days. No trouble occurred during the operation. After the 25 day-operation, the reactor was opened and inspected. No agglomerate which would be detrimental to the operation remained in the reactor.

COMPARATIVE EXAMPLE 1

Example 1 was repeated except that the opening direction (A) of the caps in the distribution plate was made the same as the tangential direction (B) shown in FIG. 4. On the third day after the start of the operation, the powder recovering line 14 was blocked up with polymer agglomerates. The reactor was opened and inspected. It was found that polymer agglomerates remained in a width of about 60 mm and a height of about 100 mm on the wall surface corner portions of the reactor and in the vicinity of the shaft 3 of the agitator 2.

What is claimed is:

1. A fluid bed reactor system in which an olefin monomer or monomers can be catalytically polymerized in a fluid bed under fluidized conditions and comprising a cylindrical reaction vessel, a distribution plate provided in the lower section of the vessel, an agitator disposed in a fluidized bed above the plate and adapted to cause a rotational flow in the fluidized bed, a fluidizing gas medium supply line means provided below the plate and adapted to cause said fluidized conditions, a catalyst introducing line means adapted to supply a catalyst to the fluidized bed, a fluidizing gas medium recycle line means provided above the fluidized bed in the reaction vessel and adapted to recycle the gas medium to the gas medium supply line means, and a polymer product recovering line means adapted to recover the polymer product from the fluidized bed; characterized in that the distribution plate satisfies the following conditions, (i) each of a plurality of passage holes provided in the distribution plate for passage of the fluidizing gas medium is covered with a cap having an opening, (ii) the opening in said cap is provided only on one side of the cap, and the direction (A) of the opening is not opposite to the direction (B) of the rotational flow, (iii) the direction (A) of the opening varies with the distance (d) from the center (X) of the plate to the center (Y) of the hole, (iv) the opening direction (A) of the cap or caps at a hole or holes which are located closest to said center of said plate is nearer to the center (X) than is the tangential direction of a circle having the center (X) as a center and the distance ($d_{min.}$) to the hole or holes as a radius, (v) the opening direction (A) of a cap or caps at a hole or holes which are located furthest from said center of said plate is directed farther from the center (X) than is the tangential direction of a circle having the center (X) as a center and the distance ($d_{max.}$) to the hole or holes as a radius, and (vi) the opening direction (A) of caps at holes other than the hole or holes specified in (iv) and (v) are displaced from the direction specified in (iv) to the direction specified in (v) according to the distance (d) to these holes.

2. The reactor system of claim 1 wherein each cap has such a shape that it is inclined downwardly in a direction opposite to the opening direction (A) from the end portion of the opening in the can to the portion of the can contacting the surface of the distribution plate.

3. The reactor system of claim 2 wherein the cap has a substantially trianglular pyramidal shape.

* * * * *